Patented Apr. 22, 1952

2,594,266

UNITED STATES PATENT OFFICE 2,594,266

PREVENTION OF RUST

Franklin M. Watkins, Flossmoor, Ill., assignor to Sinclair Refining Company, New York, N. Y., a corporation of Maine No Drawing. Original application December 31, 1945, Serial No. 638,581. Divided and this application April 7, 1949, Serial No. 86,121

4 Claims. (Cl. 44—74)

My invention is concerned with preventing or retarding rusting, especially rusting due to water dissolved in or settled from light petroleum distillates, particularly gasoline. By light petroleum distillates I means petroleum distillates of a viscosity not exceeding that of gas oil.

Rust frequently occurs in gasoline pipe lines, storage tanks, and even in automotive equipment because of traces of moisture inevitably present in the gasoline. Although gasoline as it leaves the refinery is usually free of occluded moisture it may contain as much as 0.005–0.01% dissolved moisture. Part of this dissolved moisture separates when the gasoline is chilled and settles as a separate liquid phase beneath the main body of gasoline. Water may also enter gasoline systems along with air through partially filled tanks provided with breather devices. As such a tank cools, for example, at night, its contents contract and moisture laden air is drawn in. This moisture condenses on the walls of the tank, settles to the bottom and dried air is expelled when the contents of the tank again warm up, as from the heat of the sun the next day. Repetition of this cycle eventually leaves appreciable amounts of moisture at the bottom of the tank.

Although several methods have been proposed for preventing rusting in gasoline handling systems, each of these has rather obvious shortcomings. One method, for example, involves drying of the gasoline by absorption on dehydrated alumina before the gasoline is pumped into pipe lines. Another method involves the introduction into the gasoline of chemicals such as mercaptobenzothiazole or hydrogen which react with dissolved oxygen and thereby arrest corrosion. Still another method involves the introduction of water soluble corrosion inhibitors such as sodium nitrite or chromates. Each of these methods is disadvantageous as affording only temporary protection. Sodium nitrite applied to inhibit rusting in pipe lines is frequently decomposed by the action of oxidizing agents present in some crude oils. Hydrogen is quickly lost from vented storage tanks while water soluble inhibitors are lost when they settle to the bottom of storage tanks and are drawn off. Water soluble inhibitors are further deficient in many instances in not affording protection in the oil phase.

Petroleum ammonium sulfonates obtained by reaction of ammonia with sulfuric acid-treated hydrocarbon oil, i. e., by the ammoniation of mahogany acids, have been known to possess appreciable solubility in both water and hydrocarbon oils. I have now found that such sulfonates when present in light petroleum distillate even in an exceedingly minute proportion have the property of inhibiting the rusting of iron and steel surfaces and my invention is predicated on such discovery.

In the practice of my invention, I customarily employ the ammonium sulfonates as a concentrate in the oil from which they are derived. A typical concentrate may have, for example, a sulfonate concentration of about 10% by weight and may test as follows:

| | |
|---|---|
| Gravity °API | 28.0 |
| Flash °F | 385 |
| Fire °F | 445 |
| Viscosity at 100 SUS | 416 |
| Viscosity at 130 SUS | 163 |
| Viscosity at 210 SUS | 49.2 |
| Viscosity index | 90 |
| Color | 4½ |
| Nitrogen (per cent) | .265 |
| Acid number | 9.0 |
| Sulfur (per cent) | .60 |

This particular concentrate was prepared by treating a mid-continent neutral oil with four successive dumps of oleum, a total of 120 pounds of the oleum being used for each barrel of oil. Following removal of the separable sludge after the last dump of oleum, the acid oil was blown with air to remove $SO_2$ and settled to remove substantially the last trace of sludge. Thereafter the oil was mixed with 0.6% by weight of water and neutralized with an excess of anhydrous ammonia. Finally the oil was heated to a temperature of 280° F. to dehydrate it, and filtered to obtain the above product.

Concentrates thus prepared find wide application. Thus, in addition to being used to inhibit rusting in gasoline storage tanks, pipe lines, etc., they may be blended with oils of suitable characteristics to provide improved light distillate fuel oils which will retard the corrosion of iron and steel surfaces with which they come into contact. In such applications as little as 5 to as much as 400–500 lbs. of the concentrate (10% oil-free sulfonates) may be used per 1000 barrels of oil, the exact amount depending upon the degree of protection required and other factors including the extent of solubility of the sulfonates in the oil, the viscosity of the base oil, etc.

I have found that the sulfonate concentrates are not satisfactory for use in turbine oils as anti-rust agents because of the emulsifying properties of the sulfonates. These emulsifying properties, however, do not interfere with its use as a top cylinder lubricant or in automobile radiators, for example.

My invention is further illustrated by the examples below which are in part comparative. In rusting test "A" referred to in the examples, a polished, mild steel strip is suspended in a beaker fitted with a mechanical stirrer and containing 350 ml. of the test blend. The blend is stirred for 30 minutes, after which 50 ml. thereof is removed and 30 ml. of distilled water substituted. Stirring is continued for 48 hours and the strip then inspected for rust. The test is carried out at room temperature. In the static test referred to in the examples, 100 ml. of the test blend is placed in a 4 oz. stoppered bottle together with a polished, mild steel strip and the bottle allowed to stand for 30 minutes to precoat the strip. 10 ml. of water is then added and the mixture is shaken or rolled on a horizontal surface for about 1 minute, whereafter the bottle is stored in an upright position for 24 hours at the end of which time that portion of the strip in both the oil and water layers is examined for rust.

*Example I*

An oil concentrate containing 10% by weight of ammonium mahogany sulfonates was added to three samples of an 80 octane all purpose gasoline in different amounts and the blends tested for rusting with the following results:

TEST "A"

| Sample Number | Lbs. Concentrate per 1000 bbls. Gasoline | Concentration Mahogany Solfonates Oil-free Basis | Rust After 48 hours |
|---|---|---|---|
| 1 | 9 | 0.9 | less than 5% of surface rusted. |
| 2 | 18 | 1.8 | detectable trace of rust. |
| 3 | 27 | 2.7 | no rust. |

STATIC TEST

| Sample Number | Lbs. Concentrate per 1000 bbls. Gasoline | Concentration Mahogany Acids Oil-free Basis | Rust After 24 hours | |
|---|---|---|---|---|
| | | | Water Layer | Gasoline Layer |
| 4 | | | 75-100% of surface rusted. | 75-100% of surface rusted. |
| 5 | 9 | 0.9 | 75-100% surface rusted. | 5-25% surface rusted. |
| 6 | 18 | 1.9 | less than 5% surface rusted. | no rust. |
| 7 | 27 | 2.7 | trace of rust. | Do. |
| 8 | 90 | 9.0 | No rust. | Do. |

When the static test was continued for an additional 48 hours there was no change in the results as to Samples 6, 7, and 8. There was no change after a total of 240 hours in the instance of Sample 8. The inspection on the gasoline used in the tests was as follows:

| | |
|---|---|
| Gravity °API | 68.3 |
| RVP at 100 | 6.6 |
| Bromine number | 21.5 |
| Color | Red |
| ASTM gum | 2.4 |
| CD gum | 11.1 |
| $O_2$ Bomb (min.) | 590 |
| Octane No. (mm.) | 79.5 |
| 100 cc. dist'n.: | |
| IBP | 132 |
| 10 | 147 |
| 50 | 210 |
| 90 | 301 |
| EP | 374 |

*Example II*

A mixture of green acid ammonium sulfonates and a concentrate containing 40% base oil and 60% sodium petroleum mahogany sulfonates were tested in the same gasoline with the following results:

STATIC TEST

| Sample Number | Additive | Concentration in Lbs. per 1000 bbls. | | Rust after 24 Hrs. | |
|---|---|---|---|---|---|
| | | Concentrate | Oil-free Sulfonates | Water Layer | Gasoline Layer |
| 9 | Green acid ammonium sulfonates. | 2.5 | 2.5 | 75-100% surface rusted. | about 5% surface rusted. |
| 10 | Green acid ammonium sulfonates. | 15 | 8.25 | 25-50% surface rusted. | 5-25% surface rusted. |
| 11 | Green acid ammonium sulfonates. | 9 | 9 | 75-100% surface rusted. | about 5% surface rusted. |
| 12 | Sodium sulfonates | 5 | 3.0 | 75-100% surface rusted. | 25-50% surface rusted. |
| 13 | Sodium sulfonates | 45 | 27 | 50-75% surface rusted. | 5-25% surface rusted. |

These tests demonstrated that the amonium mahogany sulfonates are much more effective than green acid or alkali metal sulfonates. Sodium petroleum sulfonates are produced by neutralizing acid oil with sodium hydroxide; green acid ammonium sulfonates by treating acid sludge with ammonia.

*Example III*

The 10% concentrate of ammonium sulfonates was added in different amounts to samples of virgin gas oil and the blends tested according to the procedure of Example II. 400 lbs. of the concentrate per 1000 bbls. of oils completely prevented rusting in both the oil and water phases.

*Example IV*

A mixture of 1.0% ammonium mahogany sulfonates in drinking water was prepared and the emulsion formed by shaking the mixture poured into a 250 cc. mixing cylinder containing a polished, measured and weighed, flat steel strip. Sufficient synthetic sea water was added to give a chloride ion content of 50 P. P. M. and the pH was adjusted to 8-9 with trisodium phosphate solution. The mixture was then thoroughly shaken and put in a 150° F. constant temperature bath for 100 hours. At the end of the 100 hours, the strips were removed, wiped clean, and examined for corrosion, and then cleaned chemically with boiling aqueous NaOH—zinc dust, rinsed, dried, and weighed.

The rate of corrosion in inches per year was calculated by the formula given in Navy Department Specification 51-I-11 of May 15, 1945:

$$\frac{\text{Weight loss (gms.)}}{\text{Area (Sq. In.)}} \times 0.683 = \text{Corrosion rate in inches per year}$$

The rate of corrosion was found to be only .0001 inch per year.

This application is a division of my application Serial No. 638,581, filed December 31, 1945, now abandoned.

I claim:

1. Gasoline to which a rust-inhibiting property has been imparted by the incorporation of a rust-inhibiting agent consisting essentially of ammonium mahogany sulfonates the amount of ammonium mahogany sulfonates approximating .0005-.05 pound on the oil-free basis per barrel of gasoline.

2. A light petroleum distillate of a viscosity not exceeding that of gas oil to which a rust-inhibiting property has been imparted by the incorporation of a rust-inhibiting agent consisting essentially of ammonium mahogany sulfonates the amount of ammonium mahogany sulfonates approximating .0005-.05 pound on the oil-free basis per barrel of light petroleum distillate.

3. Method of preventing the internal corrosion of pipe lines, storage tanks, and the like, which comprises incorporating in a light petroleum distillate introduced thereinto a rust-inhibiting agent consisting essentially of ammonium mahogany sulfonates the amount of ammonium mahogany sulfonates approximating .0005-.05 pounds on the oil-free basis per barrel of light petroleum distillate, said distillate having a viscosity not exceeding that of gas oil.

4. Method of preventing the internal corrosion of pipe lines, storage tanks, and the like, which comprises incorporating in gasoline introduced thereinto a rust-inhibiting agent consisting essentially of ammonium mahogany sulfonates, the amount of ammonium mahogany sulfonates approximating .0005-.05 pounds on the oil-free basis per barrel of gasoline.

FRANKLIN M. WATKINS.

REFERENCES CITED

The following references are of record in the file of this patent:

UNITED STATES PATENTS

| Number | Name | Date |
| --- | --- | --- |
| 2,296,069 | Talbert et al. | Sept. 15, 1942 |
| 2,398,193 | Sharp | Apr. 9, 1946 |
| 2,402,793 | White et al. | June 25, 1946 |
| 2,422,515 | Anderson | June 17, 1947 |
| 2,480,639 | Duncan | Aug. 30, 1949 |
| 2,482,517 | Schiermeier | Sept. 20, 1949 |

OTHER REFERENCES

"Sulfonation Products of Mineral Oil," Sperling in May 1948 Industrial and Engineering Chemistry, pp. 890 and 891.